(No Model.) 2 Sheets—Sheet 2.
W. L. COOP.
EXERCISING MACHINE.
No. 363,599. Patented May 24, 1887.
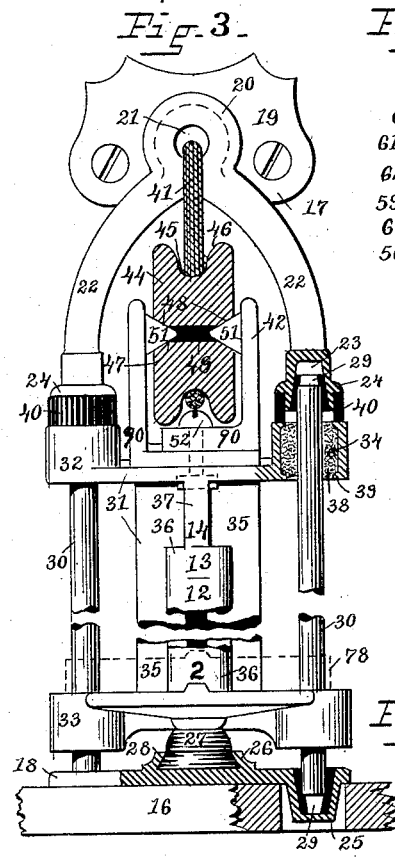
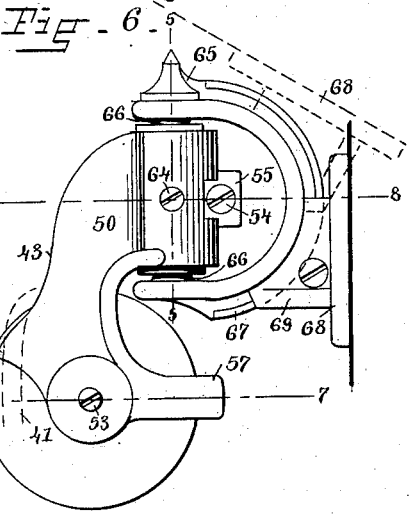
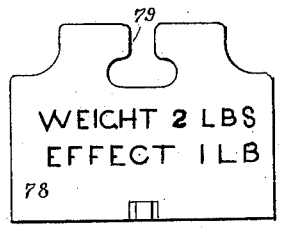
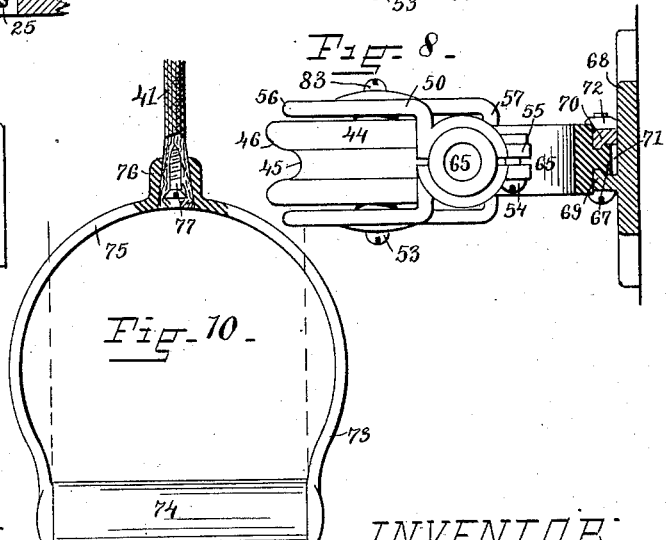
WITNESSES:
Chas H Luther Jr
M. F. Bligh
INVENTOR:
William L Coop
by Joseph A Miller & Co
Attys

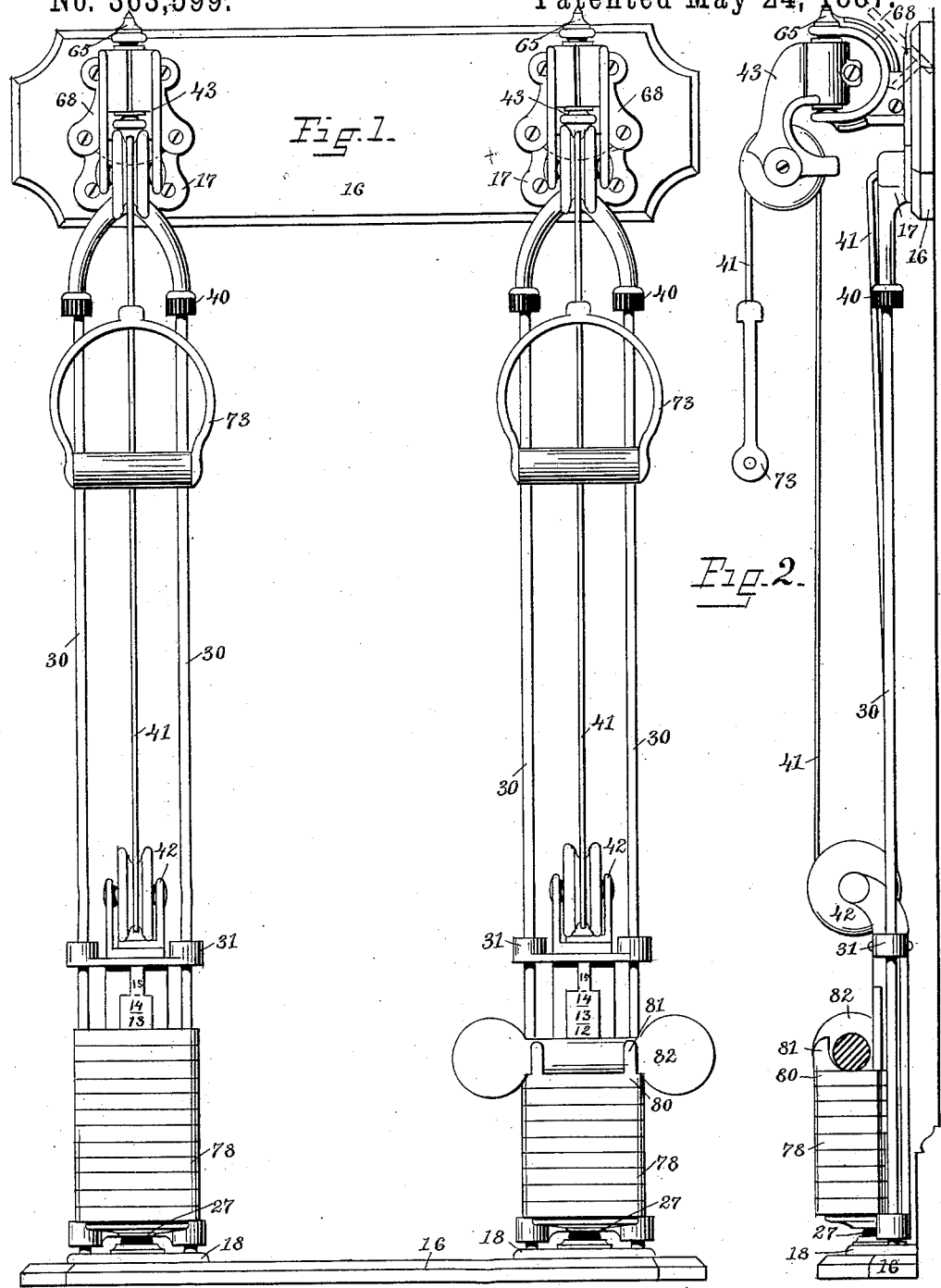

United States Patent Office.

WILLIAM L. COOP, OF PROVIDENCE, RHODE ISLAND.

EXERCISING-MACHINE.

SPECIFICATION forming part of Letters Patent No. 363,599, dated May 24, 1887.

Application filed November 8, 1886. Serial No. 218,235. (No model.)

*To all whom it may concern:*

Be it known that I, WILLIAM L. COOP, of the city and county of Providence and State of Rhode Island, have invented certain new and useful Improvements in Exercising Apparatus, of which the following is a full, clear, and exact description, reference being had to the accompanying drawings, forming part of this specification.

This invention relates to exercising or gymnastic apparatus ordinarily used for training and developing the muscles of the human body and employed for healthful and diverting exercise.

The objects of my invention are to perfect the construction and operation of several different features of exercising apparatus, to render the workings of the same more facile and quite noiseless, and, further, to render such apparatus capable of a greater variety of motions by the user thereof, and to cheapen the manufacture of this class of machinery.

To the aforesaid purposes my invention consists in the certain novel arrangements and constructions of the various parts of the machine, all as hereinafter fully described and claimed.

I have here illustrated my several features of invention as incorporated in a form of what is known as an "upright" or "standard" chest or pulley weight, designed to be used by a person in standing or sitting posture. However, I do not wish to be understood as limiting my invention to this special form of apparatus, for I intend to employ the several features of invention in different apparatus.

In the accompanying drawings, illustrating my invention, Figure 1 represents a front elevation of a form of standard chest-weight illustrating my invention. Fig. 2 represents a side view of Fig. 1. Fig. 3 represents an enlarged front view of the detached upper rod-bracket, with the attached guide-rods and weight-carrier shown in portions, and with certains details of the apparatus in sections, as hereinafter fully described. In this view the weight-carrier is drawn to the upper limit of travel. Fig. 4 represents a view, similar to that in Fig. 3, of the lower rod-bracket and the guide-rods, weight-carrier, and frame shown in portions and parts thereof in sections. In this view the weight-carrier is dropped to the lowest limit of travel. Fig. 5 represents a longitudinal sectional view of my novel form of swivel-joint, taken on line 5 5 in Fig. 6 through the swivel-axis. Fig. 6 represents an enlarged side view of my peculiar form of pulley and adjustable bracket and rack therefor, the broken lines representing the said rack in a different position of adjustment. Fig. 7 represents a sectional view of the pulley-block and sheave, taken on line 7 7 in Fig. 6. Fig. 8 represents a partial top plan and sectional view on line 8 8 in Fig. 6. Fig. 9 represents an enlarged broadside view of the novel form of weight used in my invention and showing the superscription thereon. Fig. 10 represents an enlarged view of my improved form of handle, partly in section, and shown as secured to a portion of rope. Fig. 11 represents in portion an end view of the overlapping arms 57.

In the said drawings like numbers of reference designate corresponding parts throughout.

Referring to the drawings, the frame of the apparatus is shown as comprising two bed-plates, 16, consisting of flat boards, which in this form of machine are disposed as shown. The apparatus here illustrated consists in the main of duplicate parts, and a description of one set of parts will serve for both sets.

The frame of the apparatus comprises, besides the bed-plate 16, the upper rod-bracket 17, and the lower rod-bracket 18. The rod-bracket 17 is made with a securing-plate, 19, upon which is cast a boss, 20, having a socket or rope-hole, 21, formed therein. The branches or arms 22 spring from the boss 20, and are curved downwardly and formed at the lower ends with the sockets 23, above the edges of which extend the peripheral flanges 24.

The lower rod-bracket, 18, is a flat platform cast with the sockets 25 in positions corresponding to those of the ends of the branches 22 on rod-bracket 17. About the center of rod-bracket 18 is formed an annular collar, 26, into which is nested and securely seated by its own elasticity the rubber buffer-plug 27, formed with a flange, 28, upon the base thereof and designed to be forced under the rim of the collar 26, and to act as hereinafter described. The lower rod-bracket, 18, is set upon the bed-plate 16, and has the sockets 25 sunk therein, as shown in Fig. 4.

The sockets 23 and 25 of the upper and lower rod-brackets, respectively, are of a truncated-cone shape, and are provided with the tubular linings 29, made of rubber or soft fabric. The cylindrical guide-rods 30 are placed vertically and parallel with the upper ends resting in the rubber-lined sockets 23 and the lower ends resting in the sockets 25 of the respective upper and lower rod-brackets.

The weight-carrier 31 consists of a structure formed of a slide, 32, and a slide, 33, each having two guide eyes or ways, 34, formed therein, and which work on the guide-rods, as shown. The slides are spaced and are rigidly connected by the upright standard 35, on the front face of which is cast longitudinally thereof the holding-rib 36, which is T shape in cross-section, and is formed at the upper end with a diminished portion, 37. This holding-rib is for the purpose of holding the separable weights upon the carrier 31, as hereinafter described.

The guide eyes or ways 34 of the weight-carrier 31 are all furnished with a lining in the form of a cloth or wooden collar or ring, 38, which will render the sliding of the carrier over the guide-rods quite noiseless. The interiors of the guide-eyes 34 are cylindrical in form and are provided near each mouth thereof with the shoulder 39, designed to confine the soft lining 38 in operative position and hold it against slipping on its length.

Upon the extreme ends of the depending branches or arms 22 of rod-bracket 17 are set the elastic or rubber buffer-collars 40, which are held thereon by their own elasticity and are situated so as to receive the upward blows or bumping of the weight-carrier 31 when elevated to the upper limit of travel, and serve to deaden the bumping effect that would otherwise make a disagreeable jarring. The rubber buffer-plug 27, mounted on the lower rod-bracket, 18, directly below the weight-carrier, serves the same purpose as the buffer-collars just described—namely, to destroy the thud and thumping of the descending weight-carrier when loaded with weights. This equipment of the guide-rods with rubber-lined resting-sockets and of the weight-carrier with the soft-lined guide-eyes and rubber buffers proves an important advantage in the results gained, since the traveling of the weight-carrier upon the guide-rods and the inevitable bumping of the same at the limits of travel are thus made quite noiseless—a desirable quality in this class of apparatus.

The apparatus I have here illustrated is constructed with combined pulleys and a compound rope working therewith. This rope 41 is fixed at one end within the rope-hole 21 of the rod-bracket 17 by passing the rope therethrough and forming a knot on the end of the rope and to the rear of the rod-bracket. The rope is then passed under the sheave of the running pulley 42, which has the weight-carrier 31 attached thereto, and is then brought over the sheave of the upper or standing pulley, 43, which is swung with a swivel-joint on an adjustable stationary bracket and rack.

I will now proceed to describe my novel construction of the running and standing pulleys 42 and 43, respectively. These pulleys 42 and 43 have a common construction in so far as their features are equivalent. Each one is provided with a pulley-sheave, 44, having a very deep cut peripheral groove, 45, constructed with the high and well-rounded shoulders 46 at each side of the mouth of the groove. This is especially designed to prevent the usual easy displacement of the rope tracked over the groove of the sheave when the rope is drawn laterally or sidewise, as is frequently the case in the use of chest-weights when the user faces the apparatus and moves his arms off toward his sides. In such instances my form of pulley-sheave, especially when combined with the swivel-joint of the pulley-block, hereinafter explained, will in a great measure prevent the easy displacement of the rope, as shown by the relative positions of the shoulders of the groove 45 and the rope 41. (Shown in broken lines in Fig. 7.) The sheave 44 I provide with a central eye, 47, shaped in longitudinal section something like an hour glass. The bearing 47 has each mouth thereof of a conical form, 48, and the throat or space intermediate of the mouths forms an oil-chamber, 49.

The pulley-block 43 is formed of two similar members, 50, and the pulley-block 42 is composed of the separable members 90, and said members of the respective pulley-blocks are each provided with the conically-shaped journal centers or points 51, which lie opposite and in axial alignment, as indicated, and which are journaled in the conical sockets 48 of the sheave. The two members forming the respective pulley-blocks are secured together at the ends remote from where the sheaves are mounted by means of a screw. This construction of the journaling of the pulley-sheaves affords an easy-running bearing, and will always run on well-oiled centers by virtue of the surrounding oil chamber 49 freely supplying the bearing-points of the joints.

The two members 90, composing the block for the running pulley 42, are cast with a flat-resting base and a curved upright having the journal-points 51 thereon. The bases of the members 90 in pulley 42 are overlapped and slide on one another, and are each formed with a slot, through which the bolt 52 works and serves to bind and release said members for the adjustment of the journal-points 51 toward and away from each other, in order to take up the wear of the bearings or to tighten and loosen the workings of the sheave. The lower end of bolt 52 passes down through the slide 32 of weight-carrier 31, and is there secured to attach the said carrier to the running pulley 42.

In the standing pulley 43 the adjustment of the journal-centers 51 is effected in a different manner from that described for pulley 42, and it consists in a jam-screw, 53, turning in one member of the pulley-block, and the screw-rod 83, mounted across and within both members of the block and extending through the oil-chamber 49, as clearly shown in Fig. 7. It is evident that a ready adjustment of the journal-centers may be made by turning the screw-rod 83, and that the screw-rod may be then set against loosening by means of the jam-screw. The two members 50 of pulley 43 are held together at the upper end by means of the tie-bolt 54, passing through the ears 55, cast one on each member, as illustrated. At opposite points on the front margin or edge of the block of pulley 43 are formed the outwardly-projecting curved guard-arms 56, which are placed about in the position shown, slightly above the axis of the sheave, and are for the purpose of meeting and holding the rope from being drawn sidewise from out of the groove 45 of the sheave, as would in some cases happen were the guard-arms not used. This defect of the rope drawing out from the groove may be illustrated by the rope 41. (Shown dotted in the faulty position in Fig. 6, showing the position the rope would assume in the absence of the guards.) When the rope is pulled quickly over the pulleys some positions of the attached weights will cause considerable slack in the rope, which will then tend to whip off the rear of the pulley-sheave and become entangled. To prevent this likely accident I provide the pulley-block with a guard arch, 57, which spans the periphery of the sheave transversely thereof, and is formed by curved pieces or arms 57, cast one upon each member 50, and which overlap in a sliding joint at point 58 in Figs. 7 and 11.

The upper end of the block of pulley 43 is curved over, and is formed with a chamber, 59, constructed by the semi-cylindrical cavities cast on the end of each member 50. In the ends of chamber 59 work the sliding sections 60, formed cylindrical shape, with the outer faces each provided with a conical bearing or socket, 61. The inner opposite faces of the sliding sections 60 are made with the semi-conical-shaped ways 62, in which works the conical wedging-block 63, driven to and fro by means of the adjusting-screw bar 64, which is passed through the axial line thereof, and has the head set through the wall of the chamber 59, as illustrated. This wedging-block 63 and its screw serve to move the sliding sections toward and away from each other in an obvious manner.

The curved or U-shaped bracket 65 is cast with the conical journal-sockets 66, looking inwardly and lying oppositely in axial alignment, and is also formed with a ridge or tongue, 67, on the curved back thereof, which tongue projects outwardly, and is T shape in cross-section, as shown in Fig. 8. The journal-centers 66 are placed and work in the conical bearings 61 of the sliding sections 60, adjustable, as before described. This swivel-joint, formed at the upper end of the standing pulley, has the axis thereof in a plane normal to the axis of the sheave of said pulley.

The rack 68 comprises a securing-plate, upon which is formed the extension 69, and with which works a separable body, 70, adjustably connected with extension 69 by binding-bolt 72, and is formed as a counterpart thereto. These parts 69 and 70 are formed with the groove 71, which is made circular and in conformation to the curve of bracket 65, and is adapted to receive the tongue 67, which slides therein in an evident manner. By virtue of this construction the groove 71 is dilatable, and the bracket may be bound therein by means of the binding-screw 72, and may be released and adjusted as desired. The advantages of having the bracket and rack of the swiveled standing pulley relatively adjustable are that the rack may be placed angularly upon the wall, instead of flatly thereon, and may be placed upon inclined beams or girders, usually found in gymnasiums; or the rack may be secured upon the ceiling in some cases, where such a position of the standing pulley becomes necessary to rig up apparatus similar to that shown herein.

The securing-plate of the rack 68 is placed against the bed-plate 16 of the machine-frame, above the upper rod-bracket 17, and the rope 41 is then passed over the pulley from the running pulley, as before described.

The handle 73 for pulley-weight machines is constructed of a hand-bar, 74, and a widely bowed or curved yoke, 75, formed in the shape of the major part of a circle, with the ends slightly straightened and flattened, which are secured to the respective ends of hand-bar 74 by means of screws or a tie bar running therethrough, or in any ordinary manner. About the center of yoke 75 is made a perforation or socket, 76, (see view in Fig. 10,) into which the end of rope 41 is introduced, and the jam-screw 77 is there forced into the body of the rope from toward the inside of the yoke, and is seated in the position shown, whereby the rope may be readily and securely attached to the handle. In the varied motions of the users of pulley-weights the hands are rubbed against by the sides of the handles. This defect, besides being disagreeable to the user, renders these machines somewhat unpopular. To overcome this defect I have formed the yoke 75 of the partially circular form shown, in which the sides are far removed from a plane normal to the ends of the hand-bar 74, as clearly represented in Fig. 10, wherein the dotted lines illustrate the planes alluded to. In this form of a handle the sides thereof will not rub or strike the hands of the user in the many different motions performed.

In the usage of exercising apparatus it is desirable to have a machine in which the number of pounds or weight of the weights carried by the apparatus may be readily indicated and read by the user. To supply this need I have constructed the weight-carrier of the apparatus with a graduated scale with characters or numbers thereon indicating the number of pounds or effect in pounds of the weights used. As shown in this machine I have formed the holding-rib 36 of the standard of the weight-carrier 31 with transverse marks and intermediate numerals. In this structure the lowest number of the scale may read for the actual weight or the effect of the weight of the sliding weight-carrier. The next number above may read for the weight or effect of said carrier plus the next superposed weight or effect thereof, and so on up the scale. The graduations may be made so that the lowest number displayed or the number nearest the superposed weights may read for the weight carried or the effect produced. For illustration, it may be supposed that the actual weight of the sliding weight-carrier 31 is four pounds. With the combined set of pulleys this weight will produce an effect of two pounds. Accordingly the lowest number of the graduated scale on the carrier reads "2" pounds. Now, if the series of weights used are of a uniform weight—for example, two pounds—when one of them is placed upon the carrier the increased effect will be one pound; so the lowest number now displayed above said weight on the scale is 2 plus 1 or "3" pounds effect, as shown in Fig. 4, wherein the weight 78 is shown, in broken lines, as placed upon the carrier. In this simple way the actual effect in pounds may be always and easily read.

If preferred, the scale may be made as shown in Fig. 1, wherein the numerals covered by each superposed weight will read for the effect up to that respective weight. For instance, in Fig. 1, the effect produced will be the lowest exposed number, "13," minus 1, or 12, which is the number of the weights superposed on the carrier, supposing each weight to equal the uniform two pounds.

In order to gain a further advantage whereby the user of the machine may readily know what actual effect a weight will have when placed on the carrier, I mark each weight of a certain machine with a superscription cast with the weight, which superscription indicates the actual weight and the effect thereof produced in pounds, as clearly represented in Fig. 9, wherein the superscription on the weight 78 reads, "Weight 2 lbs. Effect 1 lb." The weights 78 are cast flat with a notch, 79, in the edge thereof, the notch being of the shape of the cross-section of the holding-rib 36 of the carrier, and slightly larger than the same, in order to slide easily thereover in placing or removing the weights. The weights have to be inserted over the rib 36 at the diminished portion 37, and have to be slid back to that portion for removal.

It is an advantage in gymnasiums to economize space and to make more compact the parts of apparatus therein used. I do this in this class of machines by reducing the number of weights necessary to use with such machines in order to acquire a given effect in pounds. I accomplish this end by making a dumb-bell saddle, whereby a dumb-bell, which is necessary to a gymnasium, may be superposed upon the weight-carrier, and so take the place of several different weights that would otherwise be required for these machines. The saddle 80 consists of a form of weight like the weights 78, cast with the holding-lugs 81 or projections upon one face thereof. These lugs 81 are curved, as illustrated, and a dumb-bell, as 82, in Figs. 1 and 2, may be readily placed upon the saddle, which has been previously mounted on the carrier, as before described.

From the foregoing description it is evident that by the various details of my invention I am enabled to make a very desirable and perfect form of exercising apparatus that will present the advantages herein claimed. Moreover, the machine I here show is of a compact, neat, and durable form, and does not require frequent oiling of the much-worked pulley-sheaves, since the oil-chambers formed therein are capacious.

There may be various modifications made in the several features of my invention without, however, making a substantial departure from the spirit of the same as herein described and claimed.

Having thus described my invention, I claim as new and desire to secure by Letters Patent—

1. The combination of a pulley-block, a sheave mounted near one end of the block, the other end of the block formed with a swivel-joint, the same comprising adjustable sections provided with bearings or sockets, journal-centers working in said bearings, and means for adjusting the sections relatively to the journal-centers, whereby the swivel-joint may be regulated to turn easily or hard, substantially as described.

2. The combination of a divided pulley-block and means for holding the members together, a sheave mounted near one end of the block, the other end of the block having a cylindrical chamber, adjustable sections of a cylindrical shape sliding in said chamber, the outer face of each section provided with a conical socket and the inner face of each section provided with conical ways constructed transversely to the axis of the sections, a conical wedging-block intermediate of said sections and working in the ways thereof, a screw-bar set through the wall of the chamber and engaging with the wedging-block and driving the same, and conical journal-centers for the conical sockets to work on, the said pulley-block divided in a plane passing through the swivel-axis and normal to the sheave-axis, substantially as described.

3. The combination of a pulley-block provided with a sheave, a swivel-joint, substantially as described, the pulley-block having the guard-arms and guard-arch, and an adjustable bracket provided with the journal-centers of said swivel-joint, substantially as described.

4. The combination of a pulley-block provided with a sheave, an adjustable swivel-joint, substantially as described, for said block, and an adjustable bracket provided with the journal-centers of said swivel-joint, whereby the pulley-block may be swung into different positions, substantially as described.

5. The combination of a pulley-block provided with a sheave, a swivel-joint, substantially as described, for said block, a curved bracket provided with the journal-centers of said swivel-joint, a rack for said bracket, the bracket and rack relatively adjustable, and means for binding and releasing them, whereby the bracket and rack may be adjusted to swing the pulley-block in different positions, substantially as described.

6. The combination of a pulley-block provided with a sheave, a swivel-joint, substantially as described, for said block, an adjustable curved or U-shaped bracket provided with the inwardly-projecting journal-centers of said swivel-joint, an outwardly-disposed ridge or tongue upon said bracket, a rack for said bracket and provided with a dilatable groove for the tongue on said bracket to take in, and means for binding and releasing the groove relative to the tongue, whereby the rack may be placed in different positions and the bracket may be accordingly adjusted to vary the position of the pulley-block, substantially as described.

7. The combination of a frame and guide-rods mounted therein, a sliding weight-carrier provided with bearings traveling on said rods, and the guide-rods provided with buffers at the limit of travel of the carrier, whereby the striking of the carrier at the limit of travel may be rendered noiseless, substantially as described.

8. The combination of a frame having vertical guide-rods mounted therein, a sliding weight-carrier traveling on said rods and consisting of two slides provided with guide-eyes and connected by a vertical standard provided with a longitudinal flanged rib T-shaped in cross-section and diminished at the upper end thereof, and one or more weights, each provided with a notch conforming to the shape of the cross-section of said holding-rib on the standard, whereby the weights may be held against dislodgment by the motion of the sliding carrier, substantially as described.

9. The combination, with a sliding weight-carrier, of a saddle consisting in a weight having holding lugs or projections and adapted to retain securely in place a dumb-bell or the like weight when placed on the holder, substantially as and for the purpose described.

10. The combination of a frame comprising a bed-plate and an upper and lower rod-bracket, vertical guide-rods mounted in the rod-brackets intermediate thereof, the rod-brackets having resting-sockets therein for the guide-rods and provided with a lining of soft material or rubber, and a sliding weight-carrier traveling on the rods, substantially as described, whereby the effect of the jarring of the carrier on the guide-rods may be destroyed by virtue of the lined rod-sockets.

11. The combination of a frame comprising a bed-plate and upper and lower rod-brackets, guide-rods mounted vertically between said brackets, a weight-carrier traveling on said rods, and the upper rod-bracket provided with circular buffers surrounding the guide-rods, substantially as and for the purpose described.

12. The combination of a reciprocating weight, a bracket below said weight, an annular collar mounted on the bracket, and an elastic or rubber buffer-plug having an annular flange adapted to be sprung under the said collar to secure the same, whereby the striking of the descending weight may be deadened, substantially as described.

13. The combination of the frame comprising a bed-plate and upper and lower rod-brackets, vertical guide-rods set in the brackets, a sliding weight-carrier traveling on said rods, and the lower rod-bracket provided on the upper face with an elastic or rubber buffer-plug for the descending carrier to impinge upon, substantially as and for the purpose described.

14. The combination of a weight-carrier and a standard mounted on the carrier and having a rib for holding weights thereon, the standard provided with a graduated scale having weight-indicating characters marked thereon, substantially as described, whereby the graduation exposed nearest the lowest graduation may indicate the weight or effect of the weights superposed on the carrier.

15. The combination of a frame, guide-rods, and a weight-carrier, all substantially as described, a running pulley carrying said weight-carrier and constructed as described, a standing pulley swiveled and having an adjustable bracket and rack mounted on the frame, a rope fixed to the frame and working over the pulley-sheaves of each of said pulleys, and a handle formed as described and attached to the free end of the rope, all constructed and operating substantially as and for the purpose described.

16. The combination of the frame and guide-rods, the running pulley and the weight-carrier and the weights, the swiveled standing pulley, the fixed rope and the handle therefor, and the rubber sockets and buffers disposed as described, all constructed, assembled, and operating substantially as and for the purpose described.

17. The combination, in the swivel-joint, of the chamber and the adjustable sections 60, sliding therein, said sections formed with the exterior sockets or bearings, 61, and the interior ways, 62, the wedging-plug 63, provided with screw-bar 64, and the journal-centers 55, suitably supported, substantially as described.

18. The combination of the pulley 43, swiveled as described, the bracket 65, provided with the journal-centers 66 and having the tongue 67, the rack 68, having the extension 69 and the body 70, both together forming the dilatable groove 71 for the tongue 67, and the binding-bolt 72, substantially as described.

19. The combination of the frame comprising the bed-plates 16 and the rod-brackets 17 and 18, mounted thereon, the guide-rods 30, the sliding weight-carrier 31, provided with the soft collars 38, the rubber sockets 29 in said brackets, and the buffers 40 and 27, all constructed and operated substantially as described.

20. The dumb-bell saddle 80, consisting in an exercising-weight formed with the holding-lugs 81, substantially as and for the purpose described.

21. In an exercising-machine, the combination, with a reciprocating weight-carrier, of a running pulley secured to the carrier and consisting of a sheave mounted in a two-part block, said block consisting of two L-shaped members with the upper arms thereof carrying the sheave and the lower arms thereof slotted and provided with a bolt for holding the members together and to the weight-carrier, substantially as herein described.

22. The combination, as hereinbefore set forth, with a rope or cord, of a handle provided with a socket appropriate to receive the rope and a jam-screw adapted to enter the rope within the socket and to secure therein the rope, substantially as described.

23. The combination, as hereinbefore described, with a pulley-block comprising two relatively-adjustable members and a sheave mounted in the block, of a rearwardly-projecting extension or arm upon each said member, said extensions or arms overlapping and adapted to slide on each other, together forming a guard-arch spanning transversely the sheave for preventing the rope from whipping off the sheave, substantially as herein described.

WILLIAM L. COOP.

Witnesses:
J. A. MILLER, Jr.,
M. F. BLIGH.